Sept. 29, 1964  J. A. ROBISON  3,150,654
COMBUSTION CHAMBER
Filed July 11, 1963

JESSE A. ROBISON
INVENTOR.

BY John R. Faulkner
Ernest A. Beutler
ATTORNEYS

United States Patent Office 3,150,654
Patented Sept. 29, 1964

3,150,654
COMBUSTION CHAMBER
Jesse A. Robison, Dearborn, Mich., assignor to Ford Motor Company, Dearborn, Mich., a corporation of Delaware
Filed July 11, 1963, Ser. No. 294,404
7 Claims. (Cl. 123—191)

This invention relates to a combustion chamber for a reciprocating, spark ignited, internal combustion engine and more particularly to a combustion chamber that precludes detonation and combustion harshness.

Combustion chambers have been proposed that suppress detonation by surrounding a primary combustion cavity with a quench area formed between closely spaced, adjacent cylinder head and piston surfaces. Because of the proximity of the cooler cylinder head and piston surfaces in the quench area, the mixture remains sufficiently cool to prevent ignition until the arrival of the flame front. The provision of a large quench area also reduces combustion chamber deposits because it promotes high turbulence and a resulting scrubbing action upon the combustion chamber surfaces.

In combustion chambers of the type described, it has been the general practice to position the ignition terminals of the spark plug as near to the center of the primary combustion cavity as possible. The central position permits a substantially uniform distance of flame travel through the combustion chamber. It has been found, however, that a central spark location in this type of chamber causes a combustion characteristic known as harshness even though detonation is suppressed. Combustion harshness is a type of objectionable combustion noise not associated with detonation or surface ignition and can be prevalent when an engine is free of one or both of these other phenomena. Harshness is the result of rapid but otherwise normal combustion.

It, therefore, is the object of this invention to provide a combustion chamber that suppresses both detonation and combustion harshness.

A combustion chamber embodying this invention comprises a cylinder bore that reciprocally receives a piston and is enclosed by a cylinder head. The cylinder head and the head of the piston have closely spaced adjacent surfaces that define a quench area of minimum height when the piston is at top dead center. A primary combustion cavity is formed between opposing surfaces of the the cylinder head and the piston head. The primary combustion cavity is surrounded by the quench area and forms a significant portion of the clearance volume. Intake and exhaust valves control the flow of gases to and from the combustion chamber through inlet and exhaust ports. A spark plug is positioned with its ignition terminals in the quench area.

By positioning the ignition terminals of the spark plug in the quench area, harshness can be eliminated without a significant decrease in combustion chamber performance. It is further desirable to position the ignition terminals as remotely as possible from the intake valve and as close as possible to the exhaust valve. The temperature of the intake valve is lower than the temperature of the exhaust valve. The longer flame travel will not result in detonation since the intake valve cools the end gases.

Further objects and advantages of this invention will become more apparent when considered in conjunction with the accompanying drawings, wherein.

Figure 1:
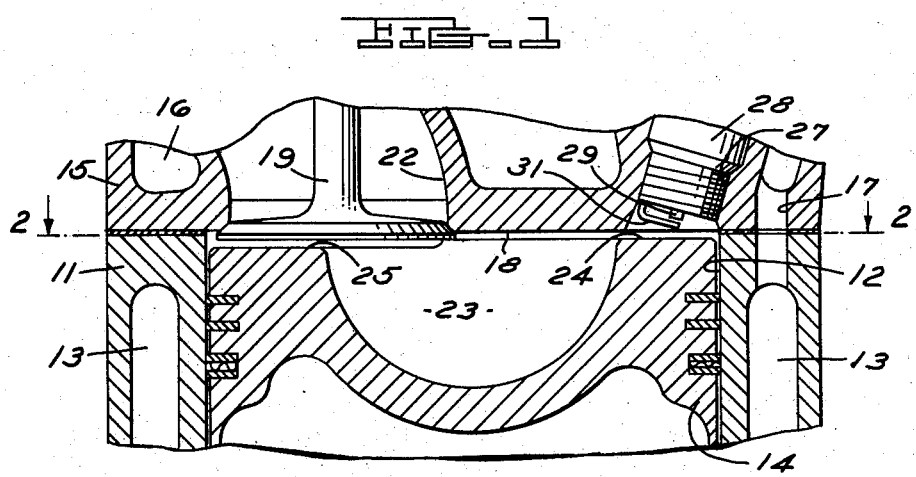
FIGURE 1 is a cross sectional view taken substantially along line 1—1 of FIGURE 2 and shows a combustion chamber of an internal combustion engine embodying this invention.
Figure 2:
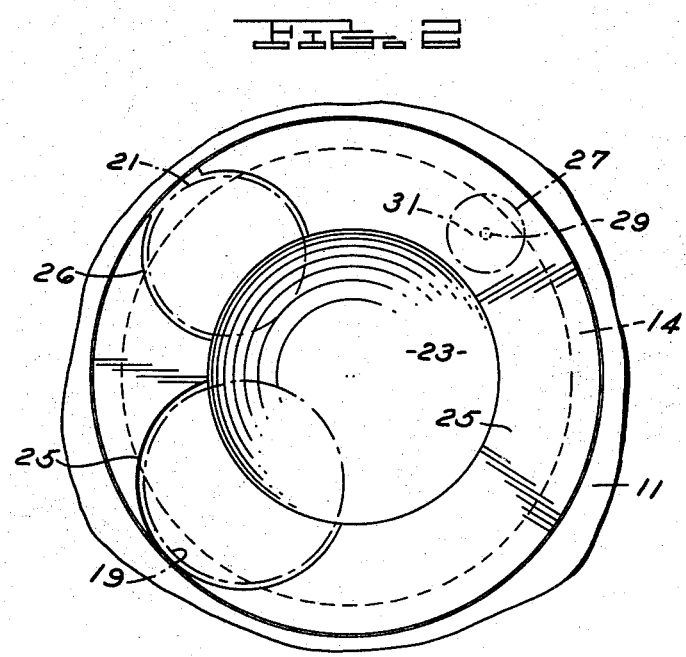
FIGURE 2 is a cross sectional view taken along line 2—2 of FIGURE 1.

Referring now in detail to the drawings, a cylinder block of an internal combustion engine embodying this invention is indicated generally at 11. The cylinder block 11 is formed with a cylinder bore 12 that is surrounded by a cooling jacket 13 and receives a piston 14. A cylinder head 15 is affixed to the cylinder block 11 in a known manner to enclose the cylinder bore 12. The cylinder head 15 is provided with a cooling jacket 16 that is interconnected with the cylinder block cooling jacket 13 by a coolant passage 17.

The cylinder bore 12 is closed by a susbtantially planar lower surface 18 of the cylinder head 15. An intake valve 19 and an exhaust valve 21 are disposed in the cylinder head 15 with their stems extending generally parallel to the axis of the cylinder bore 12. The intake valve 19 controls the flow of gases to the combustion chamber through an inlet port 22 formed in the cylinder head 15. The exhaust valve 21 controls the flow of gases from the combustion chamber through an exhaust port (not shown) formed in the cylinder head 15.

The stems of intake and exhaust valves 19 and 21 lie on one side of a first plane containing the axis of the cylinder bore and on opposite sides of a second plane normal to the first plane and intersecting it along the axis of the cylinder bore. When the valves 19 and 21 are closed, the lower surfaces of their heads lie in substantially the same plane as the cylinder head lower surface 18.

Since the cylinder head lower surface 18 is planar in the illustrated embodiment, the configuration of the combustion chamber is determined by the shape of the head of the piston 14. A primary combustion cavity 23 is formed by a depression in the head of the piston 14. The cavity 23 may be conveniently formed as a surface of revolution and is illustrated having a hemispherical shape. The center of the hemisphere lies on a diameter of the cylinder bore 12 and is offset on the opposite side of the cylinder bore 12 from the stems of the valves 19 and 21. The cavity 23 forms a significant portion of the clearance volume when the piston 14 is at its top dead center position (FIGURE 1).

The cavity 23 is surrounded by a generally planar upper surface 24 of the piston head that is closely spaced from the adjacent portions of the lower cylinder head surface 18 at T.D.C. to provide a quench area. A substantial portion of the heads of the intake and exhaust valves 19 and 21 overlie the quench area. The upper piston head surface 24 may be formed with depressions 25 and 26 to provide clearance for the intake and exhaust valves 19 and 21, respectively.

It has been found that detonation may be suppressed by forming the quench area as large as possible and by decreasing the height of the quench area as much as possible. In the illustrated embodiment a 70% quench area is provided. That is, the piston head surface 24 and the opposing, adjacent portion of the cylinder head surface 18 comprise 70% of the cross sectional area of the cylinder bore 12. The quench area has a height, that is the distance between the piston head surface 24 and the adjacent cylinder head surface 18, of 0.05 inch.

In combustion chambers of the type shown, it has heretofore been the practice to locate the gap between the ignition terminals of the spark plug within the primary combustion cavity 23. It has further been the general practice to locate the gap as close to the center of the cavity 23 as practical. The central location of the spark plug has resulted in combustion harshness which becomes more severe as the quench area is increased.

To eliminate the combustion harshness without significantly sacrificing the detonation suppressing and other combustion chamber performance, a spark plug receiving aperture 27 is formed in the cylinder head 15 over the quench area. A spark plug 28 is threaded into the aperture 27 with its ignition terminals 29 and 31 positioned directly over the piston head surface 24. By locating the gap of the spark plug 28 within the quench area, combustion harshness has been found to be eliminated.

Although the closely spaced surfaces of the piston head 24 and the adjacent cylinder head surface 18 provide a cooling or quench action upon the mixture, the heated exhaust valve 21 tends to offset the quench action. On the other hand, the intake valve 19 is cooler than the adjacent cylinder head surface and will provide an additional quenching action. If the intake and exhaust valves are equally spaced from the spark plug, as has been the previous practice, there is a possibility of detonation occurring in the area of the exhaust valve. In this invention the spark plug 28 is placed closer to the exhaust valve 21 than it is to the intake valve 19. The flame front will reach the quench area adjacent to the exhaust valve 21 early during combustion to preclude detonation. Even though the flame travel is longer, the remotely positioned intake valve 19 will provide sufficient, additional quenching action to prevent detonation.

In the illustrated embodiment, the spark plug 28 is located in the quench area on the opposite side of the cylinder bore from the intake and exhaust valves 19 and 21. It is located on the same side of a plane passing through the cylinder bore axis as is exhaust valve 21.

It is to be understood that this invention is not limited to the exact construction shown and described, which is only a preferred embodiment of the invention, but other changes and modifications may be made without departing from the spirit and scope of the invention as defined by the appended claims.

I claim:

1. A combustion chamber for a reciprocating, spark ignited, internal combustion engine comprising a cylinder bore, a piston reciprocating in said cylinder bore, a cylinder head enclosing said cylinder bore, said cylinder head and the head of said piston having closely spaced surfaces defining a quench area of minimum height when the piston is at top dead center, a combustion cavity formed between opposing surfaces of said cylinder head and said piston head, said combustion cavity being surrounded by said quench area and forming a significant portion of the clearance volume, said quench area comprising at least 70 percent of the cross-sectional area of said cylinder bore, inlet and exhaust valves for controlling the flow of gases to and from said combustion chamber through inlet and exhaust ports, and a spark plug having its ignition terminals disposed in said quench area.

2. A combustion chamber for a reciprocating, spark ignited, internal combustion engine comprising a cylinder bore, a piston reciprocating in said cylinder bore, a cylinder head enclosing said cylinder bore, said cylinder head having a substantially planar surface opposing the head of said piston, inlet and exhaust valves disposed in said cylinder head for controlling the flow of gases to and from said combutsion chamber through inlet and exhaust ports formed in said cylinder head, the heads of said valves lying in substantially the same plane as said cylinder head surface when said valves are closed, said piston head having a cavity formed therein surrounded by a surface that is closely spaced from portions of said cylinder head surface when the piston is at top dead center to form a quench area, and a spark plug having its ignition terminals disposed in said quench area.

3. A combustion chamber for a reciprocating, spark ignited, internal combustion engine comprising a cylinder bore, a piston reciprocating in said cylinder bore, a cylinder head enclosing said cylinder bore, said cylinder head having a substantially planar surface opposing the head of said piston, inlet and exhaust valves disposed in said cylinder head for controlling the flow of gases to and from said cylinder bore through inlet and exhaust ports formed in said cylinder head, the heads of said valves lying in substantially the same plane as said cylinder head surface when said valves are closed, said piston head having a cavity formed therein surrounded by a surface that is closely spaced from portions of said cylinder head surface when the piston is at top dead center to form a quench area, said valve heads overlying at least in part said quench area, and a spark plug supported by said cylinder head with its ignition terminals extending into said quench area.

4. A combustion chamber for a reciprocating, spark ignited, internal combustion engine comprising a cylinder bore, a piston reciprocating in said cylinder bore, a cylinder head enclosing said cylinder bore, said cylinder head having a substantially planar surface opposing the head of said piston, inlet and exhaust valves disposed in said cylinder head for controlling the flow of gases to and from said combustion chamber through inlet and exhaust ports formed in said cylinder head, the stems of said valves lying on one side of a plane containing the axis of said cylinder bore and the heads of said valves lying in substantially the same plane as said cylinder head surface when said valves have closed, said piston head having a cavity formed therein surrounded by a surface that is closely spaced from portions of said cylinder head surface when the piston is at top dead center to form a quench area, at least a portion of said valve heads being disposed above said quench area, and a spark plug having its ignition terminals disposed in said quench area on the opposite side of said plane containing the axis of said cylinder bore.

5. A combustion chamber for a reciprocating, spark ignited, internal combustion engine comprising a cylinder bore, a piston reciprocating in said cylinder bore, a cylinder head enclosing said cylinder bore, said cylinder head having a substantially planar surface opposing the head of said piston, inlet and exhaust valves disposed in said cylinder head for controlling the flow of gases to and from said combustion chamber through inlet and exhaust ports formed in said cylinder head, the stems of said valves lying on the same side of a first plane containing the axis of said cylinder bore and opposite sides of a second plane normal to said first plane and also containing the axis of said cylinder bore, the heads of said valves lying in substantially the same plane as said cylinder head surface when said valves are closed, said piston head having a cavity formed therein surrounded by a surface that is closely spaced from portions of said cylinder head surface when the piston is at top dead center to form a quench area, the heads of said valves overlying at least in part said quench area, and a spark plug in said cylinder head having its ignition terminals disposed in said quench area on the side of said first plane opposite to said valve stems and on the same side of said second plane as said exhaust valve.

6. A combustion chamber for a reciprocating, spark ignited, internal combustion engine comprising a cylinder bore, a piston reciprocating in said cylinder bore, a cylinder head enclosing said cylinder bore, said cylinder head having a substantially planar surface opposing the head of said piston, inlet and exhaust valves disposed in said cylinder head for controlling the flow of gases to and from said combustion chamber through inlet and exhaust ports formed in said cylinder head, the heads of said valves lying in substantially the same plane as said cylinder head surface when said valves are closed, said piston head having a cavity formed therein surrounded by a surface that is closely spaced from portions of said cylinder surface when the piston is at top dead center to form a quench area, and a spark plug having its ignition terminals disposed in said quench area at a point closer to said exhaust valve than to said intake valve.

7. A combustion chamber for a reciprocating spark ignited internal combustion engine comprising a cylinder bore, a piston reciprocating in said cylinder bore, a cylinder head enclosing said cylinder bore, inlet and exhaust valves disposed in said cylinder head for controlling the flow of gases to and from said combustion chamber through inlet and exhaust ports formed in said cylinder head, said pitson head having a cavity formed therein surrounded by a surface that is closely spaced from portions of said cylinder head when the piston is at top dead center to form a quench area, and a spark plug having its ignition terminals disposed in said quench area at a point closer to said exhaust valve than to said intake valve.

References Cited in the file of this patent

UNITED STATES PATENTS

| | | |
|---|---|---|
| 1,847,612 | Horning | Mar. 1, 1932 |
| 1,605,381 | Wirrer | Nov. 2, 1932 |
| 2,305,208 | Trammell et al. | Dec. 12, 1942 |